(No Model.)

A. BARDELL.
PAN, DISH, OR OTHER UTENSIL.

No. 356,343. Patented Jan. 18, 1887.

WITNESSES:
Otto Aufrand
William Miller

INVENTOR
Alfred Bardell
BY
Van Santvoord & Hauff
his ATTORNEYS

UNITED STATES PATENT OFFICE.

ALFRED BARDELL, OF BROOKLYN, NEW YORK.

PAN, DISH, OR OTHER UTENSIL.

SPECIFICATION forming part of Letters Patent No. 356,343, dated January 18, 1887.

Application filed October 21, 1886. Serial No. 216,839. (No model.)

*To all whom it may concern:*

Be it known that I, ALFRED BARDELL, a citizen of the United States, residing at Brooklyn, in the county of Kings and State of New York, have invented new and useful Improvements in Pans, Dishes, and other Utensils, of which the following is a specification.

This invention relates to an improvement in pans, dishes, and other utensils, as set forth in the following specification and claim, and illustrated in the accompanying drawings, in which—

Figure 1:
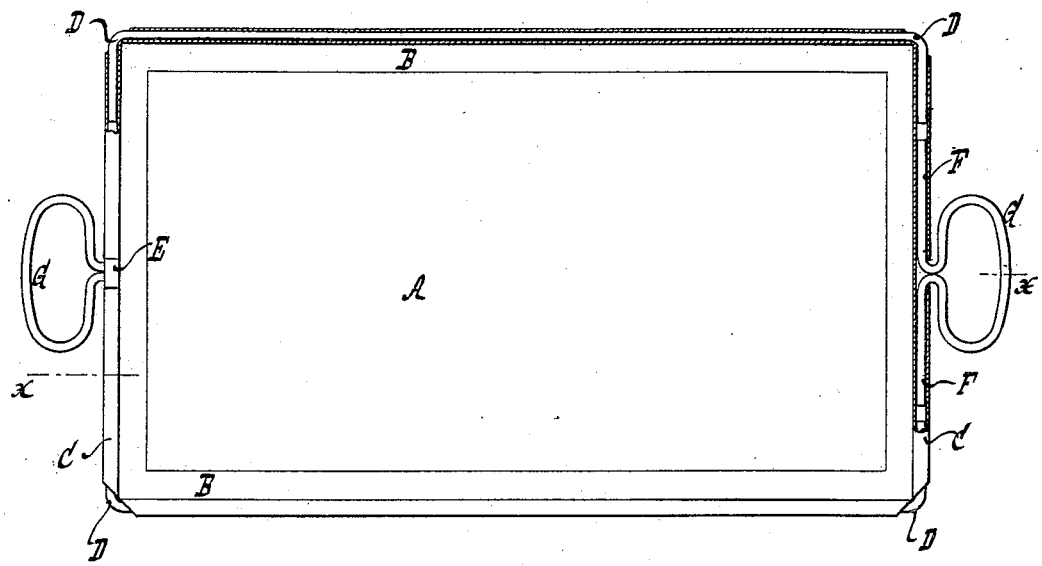
Figure 2:
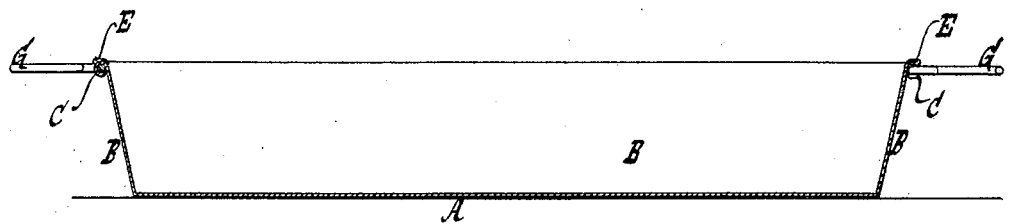
Figure 3:
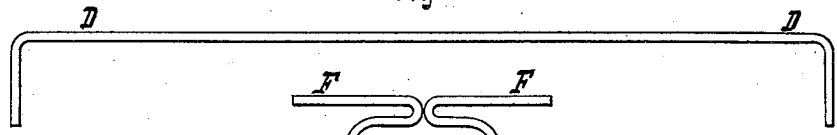
Figure 4:
Figure 5:
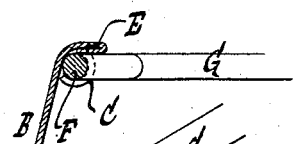
Figure 6:
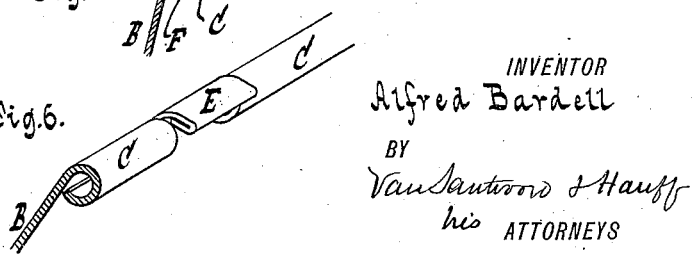

Figure 1 is a plan view, partly in section, of a pan or dish embodying my invention. Fig. 2 is a section in the plane $x\ x$, Fig. 1. Fig. 3 is a detail view of a re-enforcing wire. Fig. 4 is a detail view of a handle. Fig. 5 is a detail view, partly in section, showing a handle hinged to the pan or utensil. Fig. 6 is a detail view of part of an end flange.

Similar letters indicate corresponding parts.

The pan, dish, or other utensil is formed of sheet metal or other suitable material.

The letter A indicates the base or bottom of the utensil, and the letters B B its sides, formed with the turned-over end and side flanges C at the upper edge.

The bottom, sides, and flanges of the utensil are formed of one piece—as, for example, by stamping or shaping a piece of sheet metal in the proper manner.

To strengthen the utensil, the re-enforcing wires D are inclosed by the side flanges, and have their ends bent and inserted in the end flanges. By making the re-enforcing wires D as shown in Fig. 3, which can be readily done, for example, by shaping a suitable piece of wire, they can be inserted into the end flanges C, as seen in Fig. 1.

The utensil is provided with handles G, which are formed of bent wire and attached to the utensil by providing them with oppositely-projecting arms F, inserted in the turned-over flanges C, for which purpose the end flanges are cut away about midway between the sides of the utensil to form recesses and stop-plates E, which latter serve as stops to limit the upward swinging movement of the handles.

The side and end flanges at the corners of the utensil are cut away to provide for the convenient introduction of the re-enforcing wires D.

The construction above set forth will be found very useful, for example, in such articles as household utensils—for example, pans, dishes, and vessels of various kinds—as it furnishes a ready way of making such articles of durable character.

Having thus described my invention, what I claim is—

The combination of the utensil A, formed with the turned-over flanges C, inclosing re-enforcing wires D, and cut away to form recesses and outwardly-projecting stops E, with the handles G, formed of a bent wire having its ends journaled in the cut-away flanges and limited in their upward movement by the stops, substantially as described.

In testimony whereof I have hereunto set my hand and seal in the presence of two subscribing witnesses.

ALFRED BARDELL. [L. S.]

Witnesses:
  W. HAUFF,
  A. FABER DU FAUR, Jr.